US006801910B1

(12) United States Patent
Bedell et al.

(10) Patent No.: US 6,801,910 B1
(45) Date of Patent: Oct. 5, 2004

(54) METHOD AND SYSTEM FOR GUIDING DRILLING IN A REPORT GENERATED BY A REPORTING SYSTEM

(75) Inventors: Jeffrey A. Bedell, Arlington, VA (US); Scott Cappiello, Arlington, VA (US); L. Douglas Everhart, Arlington, VA (US); William Hurwood, Washington, DC (US); Benjamin Z. Li, Great Falls, VA (US); Fabrice Martin, Washington, DC (US); David B. Sherwood, McLean, VA (US); Steven S. Trundle, Falls Church, VA (US)

(73) Assignee: MicroStrategy, Incorporated, McLean, VA (US)

( * ) Notice: Subject to any disclaimer, the term of this patent is extended or adjusted under 35 U.S.C. 154(b) by 292 days.

(21) Appl. No.: 09/883,505

(22) Filed: Jun. 19, 2001

(51) Int. Cl.[7] .............................................. G06F 17/30
(52) U.S. Cl. ................... 707/6; 707/2; 707/5; 715/514; 715/902; 715/907
(58) Field of Search ........................... 707/2, 5, 6, 102, 707/104.1, 205; 715/514, 902, 907

(56) References Cited

U.S. PATENT DOCUMENTS

| 4,688,195 | A | | 8/1987 | Thompson |
| 4,829,423 | A | | 5/1989 | Tennant |
| 5,197,005 | A | | 3/1993 | Shwartz |
| 5,276,870 | A | | 1/1994 | Shan |
| 5,418,943 | A | | 5/1995 | Borgida |
| 5,421,008 | A | | 5/1995 | Banning |
| 5,555,403 | A | | 9/1996 | Cambot |
| 5,584,024 | A | | 12/1996 | Shwartz |
| 5,664,182 | A | | 9/1997 | Nirenberg |
| 5,692,175 | A | * | 11/1997 | Davies et al. .................. 707/3 |
| 5,692,181 | A | | 11/1997 | Anand |
| 5,787,416 | A | * | 7/1998 | Tabb et al. ..................... 707/2 |
| 5,864,856 | A | | 1/1999 | Young |
| 5,914,878 | A | | 6/1999 | Yamamoto. |
| 6,018,735 | A | * | 1/2000 | Hunter ........................... 707/5 |
| 6,094,651 | A | * | 7/2000 | Agrawal et al. ................ 707/5 |
| 6,138,150 | A | * | 10/2000 | Nichols et al. ............. 709/219 |
| 6,154,766 | A | | 11/2000 | Yost. |
| 6,247,008 | B1 | | 6/2001 | Cambot |
| 6,247,020 | B1 | * | 6/2001 | Minard ..................... 707/104.1 |
| 6,279,033 | B1 | | 8/2001 | Selvarajan |
| 6,301,579 | B1 | * | 10/2001 | Becker ....................... 707/102 |
| 6,523,035 | B1 | * | 2/2003 | Fleming et al. ............... 707/10 |
| 6,569,205 | B1 | * | 5/2003 | Poggi ......................... 715/500 |

* cited by examiner

Primary Examiner—Frantz Coby
Assistant Examiner—Haythim J. Alaubaidi
(74) Attorney, Agent, or Firm—Hunton & Williams

(57) ABSTRACT

A method and system for guiding drilling into a report are disclosed. Through the use of the invention, a user can drill within a first report dimension or from the first report dimension into a second report dimension. Additionally, a drill map providing a plurality of drilling paths is associated with each report. The system of the invention includes drill transformation tools and drill map management tools for assisting a user in navigating through report instances.

19 Claims, 7 Drawing Sheets

METHOD AND SYSTEM FOR GUIDING DRILLING IN A REPORT GENERATED BY A REPORTING SYSTEM

FIELD OF THE INVENTION

The present invention relates generally to a method and system for drilling and more particularly to a technique for improving the ease of drilling into a report.

BACKGROUND OF THE INVENTION

Drilling is a known process that allows a user to dynamically change the level of detail in an open report. When a user has executed a report instance it is frequently the case that the user, having examined the results of the execution, wishes to execute another, similar, report instance to obtain supplemental information. When a user does this, we say that the user is drilling into the original report instance. Several drilling techniques are currently known in the art. A first of these techniques is "drilling down", which drills to a lower level of attribute. The resulting report will display data with a greater level of detail. For example, drilling down could cause a display to move its focus from a given year to a given month, to a given week, and finally to a given day. A second technique is called "drilling up", which simply proceeds in and opposite direction to drilling down. A third technique is called "drilling within", which drills to a different hierarchy within the same dimension. An example of "drilling within" would be moving from an item list to a color list.

All of these drilling techniques are performed within an open report between pre-existing components. As a matter of definition, a report includes data analysis created by combining a template (the format), with a filter (the content). A report is a data set that returns the results of a business question posed by an end user of a decision support system. The data warehouse often contains hundreds of gigabytes of data including records for every day, multiple stores, items, etc. However, a single report only contains a specific subset of the data warehouse.

In the known drilling techniques, the user drills in an open report in one of the above-identified ways in order to access existing report instances. However, previously, during each drilling action, users have generally been limited to drilling within a dimension or within a narrow scope of dimensions. Furthermore, users have been required to select a drilling instance prior to each drilling action. Additionally, users have had little guidance with respect to determining the location of information most relevant to their research Accordingly, a technique is needed to increase the ease of drilling, specifically by providing a mechanism by which users can access a greater breadth of information and automatically navigate between report instances in a predefined manner based on information provided by subject matter experts.

SUMMARY OF THE INVENTION

According to the present invention, a technique for guiding drilling into a report is provided. In one embodiment, the technique is realized by a system for guiding a user's drilling into a report, the report formed through combining a template with a filter and including a plurality of dimensions. The system comprises: a report server for managing reports; drill transformation tools accessible to the report server for allowing a user to drill within a first dimension or from the first dimension to a second dimension, the drill transformation tools including a module for receiving information including a report instance and a user's drilling selection and a module for processing the information to produce a transformed drill instance; and drill map management tools accessible to the report server for managing stored information related to each report, the stored information including a drill map containing a sequence of possible drill paths associated with each report to facilitate drilling.

In accordance with other aspects of the present invention, a method is provided for guiding a user's drilling into a report. The method comprises the steps of: receiving information including a report instance and a user's selection on a report instance; receiving a user's drilling request; offering the user a drilling choice, the drilling choice including a report server selection option in which a report server selects at least one drill path based on a pre-existing drill map for the report, the drilling choice further including a self-selection option in which the user specifies the drilling path; creating a new report definition based on the received drilling choice; and executing a new report.

In accordance with still further aspects of the present invention, a method is provided for guiding a user's drilling into a report. The method comprises the steps of: receiving information including a report instance and a user's selection on a report instance; receiving a user's drilling request; accessing a drill map associated with the report instance, the drill map including a sequence of drill paths; providing a user with a selection of drill paths, the selection including at least one possible drill path; receiving a path selection from the user; creating a new report definition based on the received user selection; and executing a new report.

In an additional aspect of the invention, a method of guiding a user's drilling into a report is provided. The method comprising the steps of receiving information including a report instance and a user's selection on a report instance; receiving a user's drilling request; accessing a drill map, the drill map having been constructed by an expert capable of guiding the user through an investigation; providing the user with a selection including at least one drill path selected from the drill map; and creating a new report definition based on the selection. The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

DETAILED DESCRIPTION OF PREFERRED EMBODIMENTS

I. Drill System Components and Objects

To understand the context in which drilling occurs, a description of a business intelligence system according to an embodiment of the present invention is provided.

Figure 1:
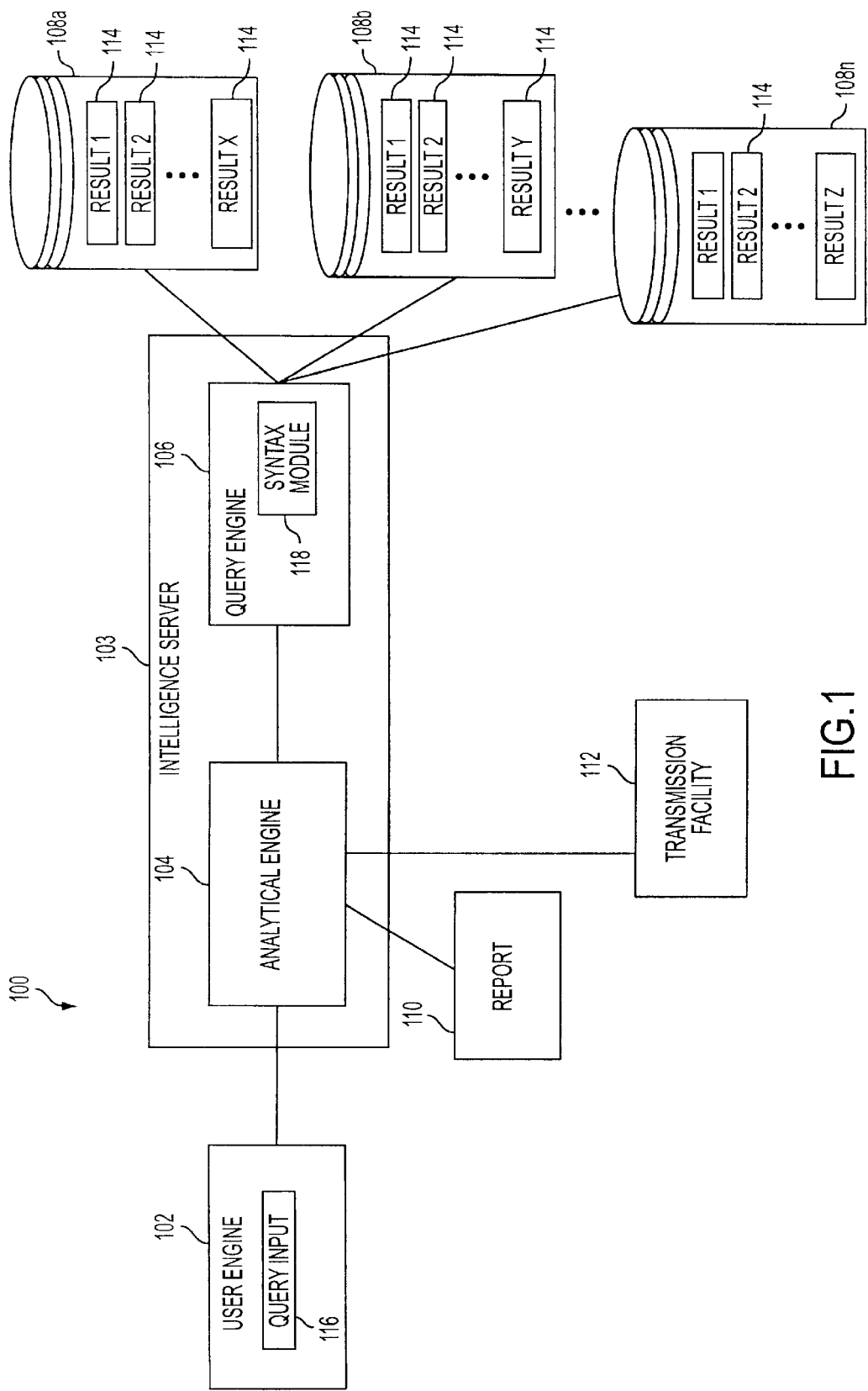
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

Figure 2:
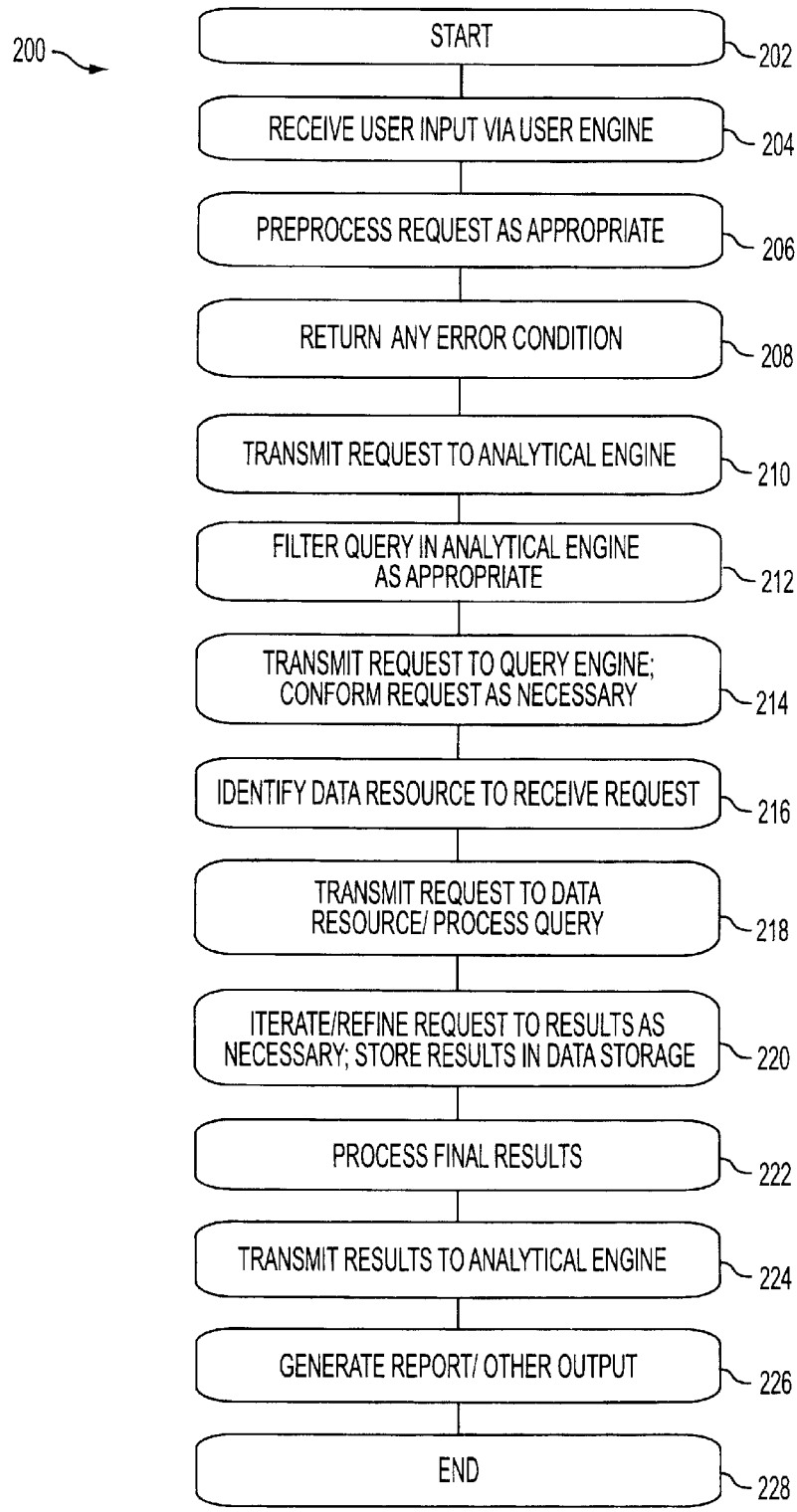
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
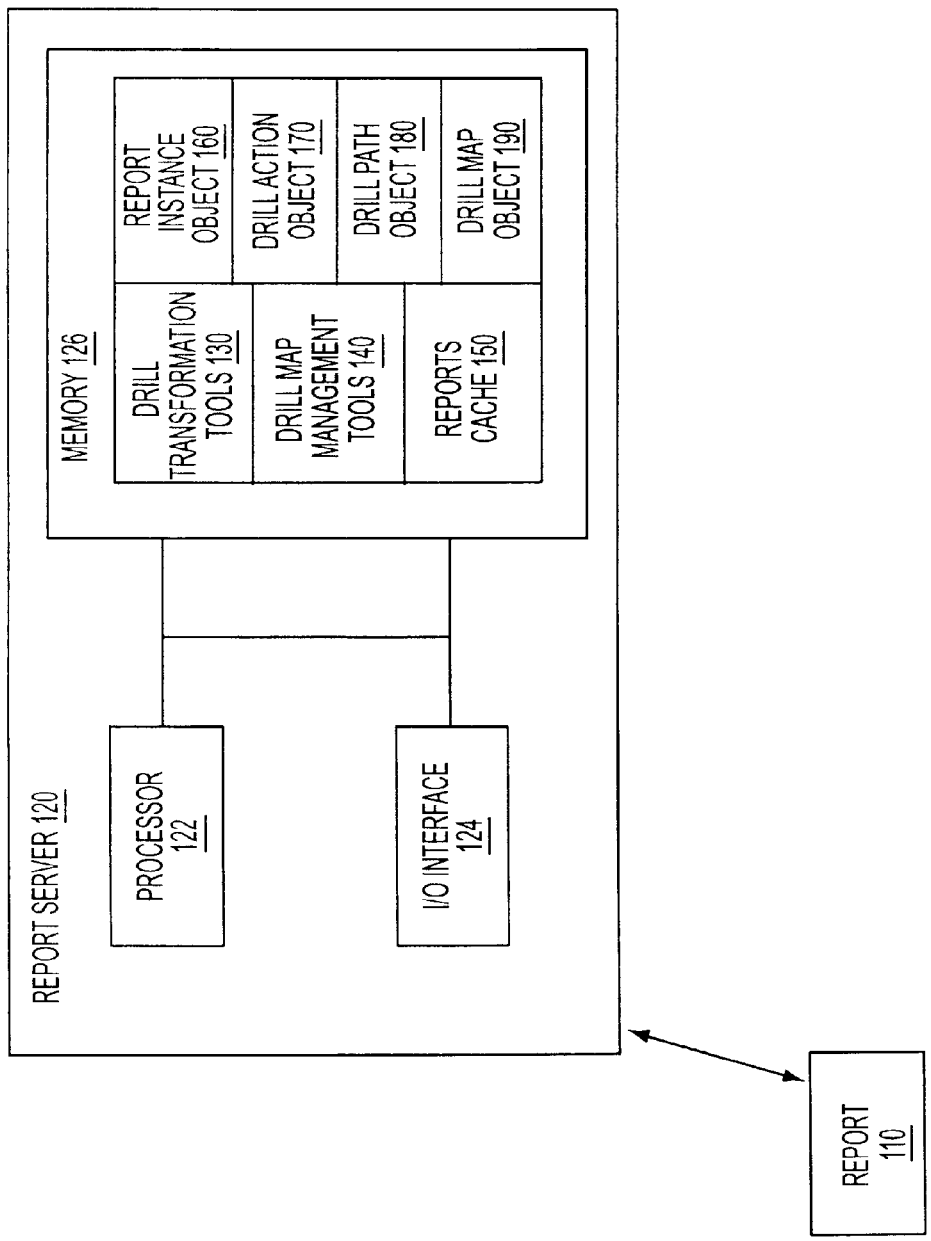
FIG. 3 illustrates a report server according to an embodiment of the invention.

FIG. 3 illustrates an embodiment of a report server 120 of the invention. The report server 120 may be a separate component or alternatively may be integrated with the analyitical engine 104, the query engine 106, or the transmission facility 112. In any embodiment, the report server 120 has the capability to access a generated report 110. The report server 120 may include a processor 122 for controlling report management and an I/O interface 124 for receiving and sending information. A memory 126 preferably stores components that operate on an a report 110. The components preferably include drill transformation tools 130, drill map management tools 140, and a reports cache 150, all of which facilitate drilling management. The report server 120 additionally includes a report instance object 160 and drill action object 170, a drill path object 180, and a drill map object 190.

The drill transformation tools 130 include code used to apply a drill transformation. A drill transformation is an action that typically changes the template of a report. The drill transformation tools 130 can take a report instance, the user's selection on the report instance and the user's chosen drill path and generate the transformed report instance. Drill map management tools 140 are capable of reading a drill map. A drill map, which will be further explained below, is a sequence of drill paths believed to be useful for a given report. Given a report instance and the user's selection on the report instance, the drill map management tools 140 find the report instance's drill map, and can return to the user a list of possible drill paths that the user might take. The reports cache 150 for may be provided for storing reports constructed by drill transformations.

The drill map management tools 140 and the drill transformation tools 130 utilize various objects as described below. These objects are shown in FIG. 3 on the report server 120 for illustrative purposes only. Each object is described in greater detail below.

A user obtains a fresh report instance by asking the report server 120 to construct one. A purpose of the report instance object 160 is preferably to hold all information associated with a particular report execution. In the case of drilling, the report instance object 160 preferably holds all of the information associated with the particular drill transformation used to make the report instance. The major information held in the report instance object 160 is: (1) information used to define the report; (2) results obtained if the report has been executed; (3) a reference to the original report instance if the report instance was created by drilling; (4) header elements and the template unit, which the user selected to indicate the part of the original report instance for drilling; (5) a list of applicable drill paths that could be used to make a drill instance; and (6) the drill action that the user selected to use to define the transformation. A report instance object 160 is a drill instance object when it is used to first hold the definition of a drill transformation, and later to hold the report definition made by applying the drill transformation as processed by the drill transformation tools 130.

A drill action object 170 contains the definition of a drill transformation. There are many different ways to define a drill transformation. The drill action object 170 records numerous properties about the transformation. First, the drill action object 170 records how the template is modified during the drill transformation. (As specified above, a report combines a template, which defines a format, with a filter which includes content). For example, an additional template could be added, a template with depth might be extended to a deeper level, or the entire template might be replaced with another template. The type of modification applied to the template is referred to as the drill type of the action. Secondly, the drill action object 170 also records how the filter is modified in the drill transformation. For example the filter could be replaced by a filter defined from the user's element selection, or additional restrictions could be added to the original filter. The report instance object 160 records the drill action objects 170 that the user has chosen to apply.

A drill path object 180 describes a path that a user might want to follow when the user wants to drill on a report. A drill path object includes several parts. First, the drill path object 180 includes the drill action object 170 that describes which transformation the report server 120 should apply if the user decides to follow a selected drill path. Secondly, the drill path object 180 includes presentation information, including several text strings. This presentation information is presented to the user to help decide whether or not to follow the selected drill path. The presentation information includes a name, a description, and a grouping construction to help a GUI group similar paths together. Finally, the drill path object 180 includes a value indicating the level of importance of a particular drill path. This value is used to select a subset of the paths when a GUI cannot display all of the paths. The drill path object 180 records the drill action object 170 that the server 120 will apply if the user follows a selected drill path.

A drill map object 190 is used to associate a collection of drill paths with a report instance. Drill maps can be saved and loaded into a metadata repository as independent objects. A drill map object 190 contains a collection of drill paths. Some of these drill paths may be explicitly recorded in the drill map object 190. Other drill paths may be implied; for example, a drill map object 190 can contain the drill paths implied by a dimension object. A drill map object 190 may specify drill paths by referring to the paths in another drill map object. A drill map object 190 may be associated with templates, projects and other items. The report server 120 uses these associations to find which of the drill maps it should use when searching for drill paths for a particular report instance.

Drill paths and the drill maps that associate selected drill paths are generally created by the author of a report or by an expert in the subject matter of the report. These individuals have extensive knowledge of the manner in which an investigation may proceed and therefore have the capability to guide a user, who is performing the drilling operations, through potentially interesting topics. In this manner, a user with limited knowledge of report subject matter will be provided with a valuable guide.

Shortcut methods on the objects involved in report drilling may eliminate the need for an application to deal directly with the report server 120. Nevertheless, some of the more obscure drill functionality will only be available through the report server 120 directly.

II. Report Execution Flow

Figure 4:
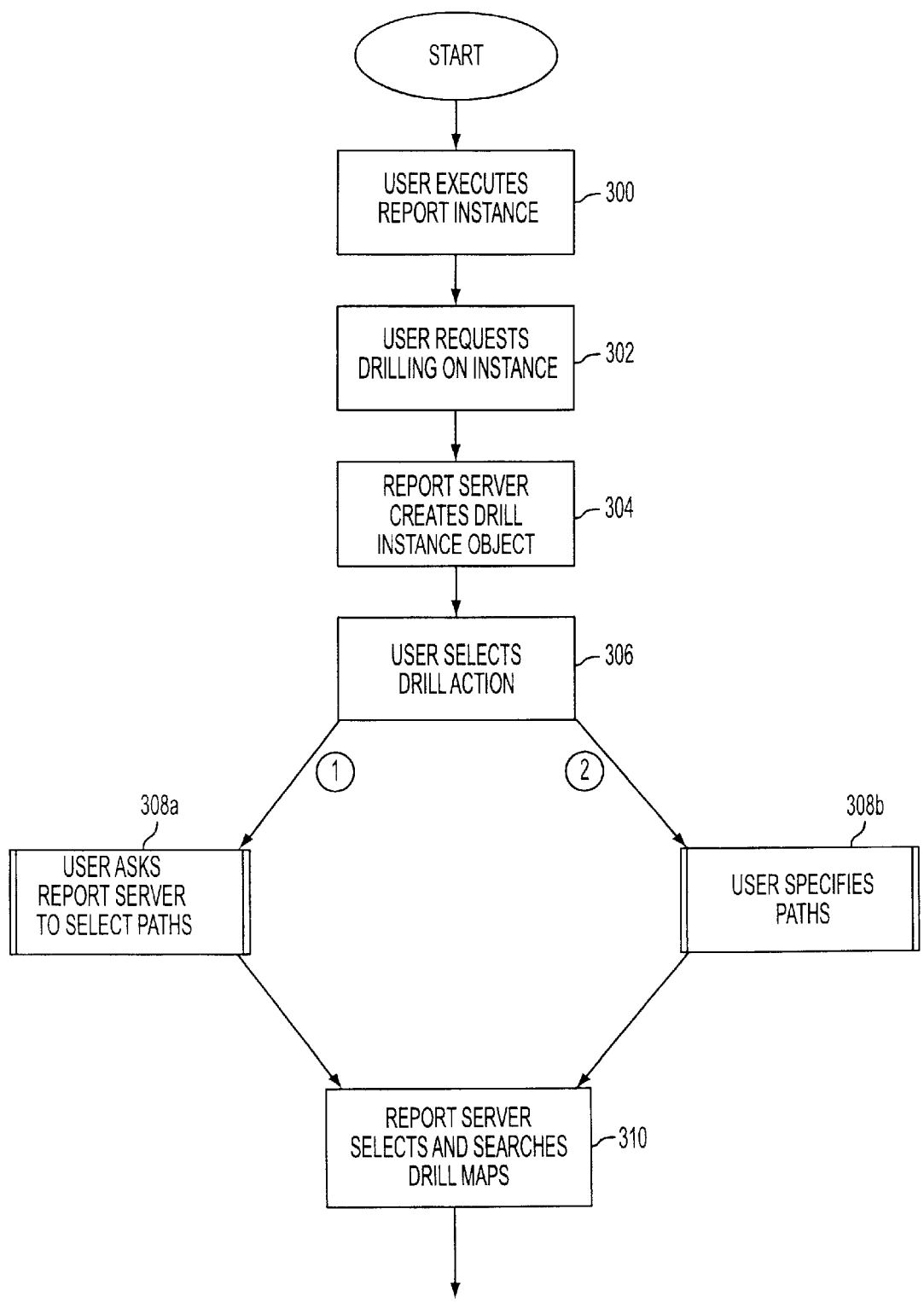
FIG. 4 is a flow chart illustrating report execution flow according to an embodiment of the invention.
Figure 5:
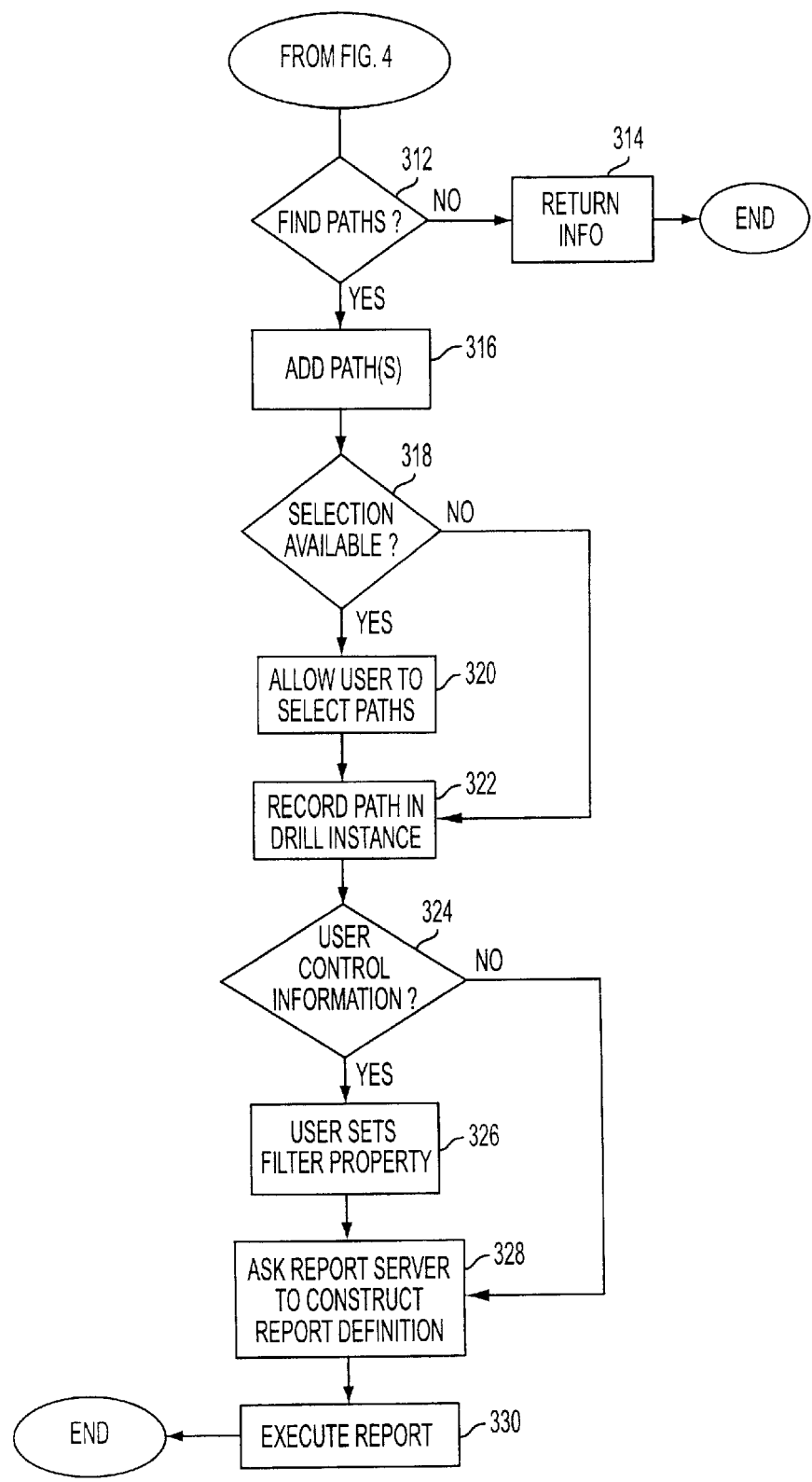
FIG. 5 is also a flow chart illustrating additional report execution flow steps according to an embodiment of the invention.

A user can implement a plurality of actions with the above-described report server 120 once the drill maps have been established. The report execution flow steps are shown in FIG. 4. Before a user can drill into the report 110, the user preferably creates and executes a report instance in step 300 in the usual manner known to one skilled in the art.

Drilling is performed on report instances. In a preferred embodiment, it is not possible to drill into a report definition. Generally, a user executes a report instance before drilling into it. However providing that the user does not want to select any header elements from a report, it is possible to drill into a report instance without executing it first.

Next, in step 302, the user should indicate in some manner that the user wants to perform a drill action on (some view of) the report instance. The way in which the user does this will depend on how the user is viewing the report instance. For example if the report instance is viewed using an ActiveX grid control then the user will probably indicate an interest in drilling by right clicking on part of the grid. If the grid is displayed as an HTML table on a web browser then the user will probably click on some HTML link to drill into the report instance.

A new report instance (the drill instance) is preferably created to hold the result of the drill transformation performed by the drill transformation tools 130. At least temporarily, the drill instance will hold all of the information associated with this drill transformation. Eventually the drill instance will include a report definition. Once the user prompts the report server 120 to drill into a report instance. the report server 120 needs to make a new report instance, to act as the drill instance object 160 as shown in step 304.

The report server 120 is the only component that can make report instance objects 160. A user can find the report server 120 by asking the session object for the session's report server. In order to make a drill instance object 160 the user or the user's application must specify the report instance that the user wants to drill into. If the original report instance has multiple view templates, then the application can specify which view template the user wants to drill into by calling a routine such as "put_DrillView" on the drill instance. If the application doesn't specify the view, the report server 120 will take the base template of the report instance as a drill view.

```
Find the report server component in this session
Dim ReportServer As IDSSReportSource
Set       ReportServer=Session.Component
   (DssRoleReportServer)

Make a drill instance instance based on RI
Dim DI As IDSSReportInstance
Set DI=ReportServer.NewDrillInstance(RI)
Set DI.DrillView=RI Views(2)
```

However for ease of use we provide a method on the report instance to perform this work in a single step. The effect of the two calls is identical.

```
Make a drill instance based on RI. (Here we assume RI only
   has one view)
Dim DI As IDSSReportInstance
Set DI=RI.NewDrillInstance
```

When the user creates a drill instance, the user specifies the report instance, and if necessary a view template inside the report instance. These properties are fixed for the drill instance. However the user may choose to select a portion of the original report instance into which he or she wants to drill. The user's selection should be recorded in the drill instance.

A user may select a template unit from the template, as the specific unit into which the user wants to drill. The selection of a template unit modifies which drill paths are considered later in the drill process. The selection also modifies the drill transformation by changing how the template is modified.

For example the user might want to drill into a "City" attribute, or the user might want to drill into a "metrics" unit. The method by which the user indicates her selection will depend on how the report instance is presented to the user. For example if the report is an ActiveX grid the (header) cell on which the user right clicks must belong to exactly one template unit. This is the template unit that the user has selected. On the web there would probably be separate links for each template unit.

Regardless of how the user selects the template unit, the application informs the drill instance of the selection by setting a DrillTemplateUnit property. The user does not have to choose a template unit in order to drill into the view.

```
Record that the user has selected the second unit on the row
   axis
Set DI.DrillTemplateUnit=DI.DrillView.Rows(2)

Alternatively if the user made the selection by choosing a
   header element E,
then the application can read the template unit directly from
   the header element
Set DI.DrillTemplateUnit=E.TemplateUnit
```

In addition to selecting a single template unit, the user may select an arbitrary set of header elements from the view template. These elements may modify which drill paths are considered later in the drill process. Also, depending on the drill action eventually chosen, these elements may be inserted into the filter so that the transformed report instance only focuses into part of the original report instance.

Again, the nature of the user's selection depends on how the report instance is displayed to the user. For example in an ActiveX control the user would probably select a header element by clicking on the corresponding cell. If the user wants to select multiple elements the user would either drag the mouse over the cells or use the control or shift keys to indicate independent selection or contiguous selection in the user manner. A web table would probably have to use check boxes if it wants to support multiple selection.

Regardless of how the user selects the header elements, the application informs the drill instance of the selection by inserting the chosen elements into a DrillElements collection further described below. The user does not have to select any elements. The chosen elements do not have to be related together in any particular manner. For example they may come from several different axes. The user is selecting elements, not rows or columns. This means that a user may select one element from some column's header, but not select another element that heads the same column.

```
Insert just the first and element on the row axis into the drill
   instance
DI.DrillElements.Clear
DI.DrillElements.Add (DI.View.Rows.AxisElements(1))
DI.DrillElements.Add (DI.View.Rows.AxisElements(2))
```

According to one embodiment, it may not be possible for the user to select a cell that contains a value for use in drilling. If the graphic interface permits a user to select a cell and ask to drill into it, then the system should behave as if the user had selected all the header elements on both the row and column which the user has selected.

Before the drill transformation tools 130 perform a drill transformation, the user preferably is prompted to select a drill action in step 306. The user has several options.

As a first option, in step 308a, the application may ask the report server 120 to select appropriate drill paths. The report server 120 will determine the paths by examining the objects in the template in order to find a drill map for the paths. As described above, the drill maps have been constructed by a knowledgeable expert who is capable of guiding a user through potential topics of interest. By selecting this first option in step 308a, the user gains the benefit having the guidance of a subject matter expert to locate related information and related reports.

The application uses a parameter to give the report server 120 an idea of how many paths it wants to find. Three settings are described below.

In a first setting, the application may ask the report server 120 to select a single drill action, without any more interactions with the user. This option is used in a situation in which the user either does not want any more interaction with the system (e.g. the user has just double clicked on something) or there is no easy way to perform the interaction (e.g. the user is going through a simple web interface).

In a second setting, the application may ask the report server 120 to select a few drill paths. The intention is that the number of paths will be small enough that a user could conveniently select from a list of all the paths. This setting is suitable for for a situation like that in a web page in which the dialog cannot conveniently present many drill paths to the user.

In a third setting, the application may ask the report server 120 to select many drill paths. There may be so many paths that a user cannot conveniently select from a flat list of the paths. This setting is used in a situation in which it is appropriate to ask the user for more information before selection on the drill action. For example an ActiveX grid pop up a menu, or hierarchy of menus for the user to choose between.

As a second option, in step 308*b*, the application may specify any drill action that it likes. This option is most likely to be used by a specialized third-party interface build on the COM API. In effect the application is bypassing the set of paths recorded with the report's definition.

If step 308*a* is selected, the application calls the Search-ForPaths method on the drill instance. This method is simply a wrapper on a call to the report server 120. It takes a parameter indicating roughly how many drill paths the application wants to see. The report server 120 writes the collection of drill paths into the DrillPaths collection of the drill instance object 160. In all cases the report server 120 will use the current values of the BaseInstance, DrillView, DrillTemplateUnit and DrillElements properties to make its selection.

Ask the report server to search for a single drill path
DI.SearchForPaths DssDrillOnePath
Alternatively ask the report server to search for a few drill paths
DI.SearchForPaths DssDrillSomePaths
Ask the report server to search for lots of drill paths
DI.SearchForPaths DssDrillManyPaths If step 308*b* is selected, the application specifies the drill action by directly setting the properties of the DrillAction property of the drill instance object 160. For example suppose the application wants the drill transformation result of the drill transformation tools 130 to replace the template in the report instance object with a template T1, and to make no other change. This may be achieved by the following code, for example.

Clear all of the properties in the drill action
DI.DrillAction.Clear

Specify that the drill action should completely replace the template with T1
Set DI.DrillAction.NewObject=T1

If the application calls the SearchForPaths method then the report server 120 will look for a drill map. It will determine the drill action or the possible drill paths by examining the drill map.

The report server 120 will look in several following places for a drill map. It will use the first drill map that it finds.

(1) On the view template in the report instance. A template may have several maps.
(2) If the user is drilling into a particular object, it will look on that object.
(3) On the project object for the current session.
(4) If it cannot find a drill map, then it will infer a drill map that contains only drill paths defined by the relationships between attributes in the system dimension.

Alternatively the application may want to miss this step entirely. It does this by passing a drill map object 190 to the report server 120 as a parameter of the SearchForPaths method. When the application passes a drill map to the report server 120, the report server 120 will use the given map, rather than searching for a new one.

Ask the report server to search for drill paths, using the given drill map
DI.SearchForPaths DssDrillManyPaths, DrillMap Once the report server 120 has decided which drill map it wants to search in step 310, it now needs to either find a drill action, or a list of drill paths. A drill map behaves as if it is an ordered list of drill paths, although in some cases the drill paths may be generated by the report server 120 instead of being explicitly listed in the map. The report server 120 goes down the list, and considers each drill path in turn.

Each drill path contains criteria that specify under what circumstances the drill path may be applied. These criteria include whether the report server 120 is searching for one action, a list of drill paths, or a short list of drill paths, and the user's selection of a template unit, and of elements. The report server 120 checks the criteria, and rejects each drill path that does not satisfy the current properties stored in the drill instance.

If the report server 120 finds an applicable path as in step 312 it will add the path(s) in one of two ways in step 316: If the application originally called SearchForPaths with flag HighImportance then the report server 120 will populate the drill instance's DrillAction property from the path's Drill Action property. The report server 120 will then exit. If the application originally called SearchForPaths, then the report server 120 will add the path it found to the instance's DrillPaths collection. It will continue searching since there may be more applicable paths later in the list.

It is possible that the report server 120 may find no applicable paths in step 312. In that case it will set DrillAction to its clear state, or return an empty DrillPaths collection as appropriate in step 314. This means that there is no drill action associated with the user's current selection.

In the application called SearchForPaths, there will probably be more than one path in the drill instance's DrillPaths collection. If a selection of paths is available in step 318, the application should then let the user select one of these paths in step 320.

Each path contains a Name, a Description and a SetName property. The user may be asked to select between the paths by name, where the paths are grouped together by SetName. The description property is available to hold a longer description of the effect of taking each path.

If the user selects one of these paths, then the application needs to record in the drill instance which path was selected in step 322. It does this by setting the drill instance's DrillAction property to be the path's Action property.

User selects the path named "City"
Set DI.DrillAction=DI.Paths("City").Action

Regardless of how the application decided to set the DrillAction property of the drill instance, it may modify it in any way it likes. The application does this by just setting properties on the DrillAction object. For example if it wants to modify a drill-to-unit action (e.g. drill to the attribute city) so that it keeps the template unit drilled from, as well as the unit drilled to, it would make the following change.

Determine if the chosen action was a drill to unit action
If DI.DrillAction.DrillType=DssDrillToUnit Then Specify that we want to keep the original unit
DI.DrillAction.KeepOriginal=True
End If In particular this is the point, in step 324, at which an application can, if it wishes "govern" the drill transformation performed by the drill transformation tools 140. The application does this by setting the Filter property of the drill action in step 326 to contain an additional filter that it wishes to apply. The application could perform some dialog with the user to determine this filter.

Even if the drill instance's action was obtained from a drill path in a drill map, the drill instance's DrillAction is a copy of the original drill action. Thus any modification that the application performs on the DrillAction in the drill instance has no effect on the action in the original drill path.

Once the application is satisfied that the Action property of the drill instance is set correctly, it calls the ApplyDrill method of the drill instance in step 328. This asks the report server 120 to construct a report definition, and if necessary a filter and template for the drill instance.

Generate the report definition for the drill instance
DI.ApplyDrill

The report server 120 will use whatever property values it finds in the drill instance when ApplyDrill is called. It will use the DrillAction, the DrillElements and the DrillTemplateUnit properties. It does not matter whether the application set the DrillAction object directly, or obtained it from a drill map.

The only reason for an application to call the ApplyDrill method is to modify the report definition (or its filter and template) in some manner before it executes them. If the application has no desire to modify the report definition, then the application should skip this step.

The ApplyDrill method makes a report definition for the drill instance. It does not execute it. The construction of the report instance is separate from its execution to give the application a chance to modify the report instance in some manner before executing it.

A report instance made by ApplyDrill is exactly the same as a report instance made directly (except that it records its drill history—that is it records how it was made). In particular it is executed in the usual manner.

Execute the new report instance
DI.Execute

As mentioned above, it is not necessary to call ApplyDrill before executing the report in step 330. If the application calls Execute without ever calling ApplyDrill then the report server 120 will perform both steps together.

III. Drill Transformations

In this Section, drill action properties that instruct the report server 120 what transformation, if any, to make to the template of the report instance are described. The simplest transformation is to leave the template unchanged, the most complex is to completely replace it with another template.

The DrillType property of a drill action is an enumeration property. Its value has overall control of what the drill action does to a template when it is applied to it. For some values of DrillType only some of the other drill action properties are relevant.

The following table lists the constants for this enumeration property. For each case we give examples of this type of template transformation.

| Constant name | Meaning | Examples |
| --- | --- | --- |
| DssDrillToTemplate | The new report instance will have a template that is unrelated to the original report instance. | Replace the original template with template T2. |
| DssDrillToUnit | The new report instance will contain a specific template unit that was not present in the original report instance. | Add the "City" attribute to the template. Add the "Time" dimension to the template. Add the "Ratios" consolidation to the template. |
| DssDrillToChild | This is a variant of DssDrillToUnit. It implies that the new unit is a child of the existing unit. | Add the "Store" attribute to the template. |
| DssDrillToParent | This is a variant of DssDrillToUnit. It implies that the new unit is a parent of the existing unit. | Add the "Country" attribute to the template. |
| DssDrillToForm | The new report instance will extend some template unit so that it displays one or more attribute forms that were not present in the original report instance. | Add the "Description" form to the City attribute. Add the "Image" form to any attribute elements that appear under the "Interesting" custom group. |
| DssDrillToDetails | The new report instance will show more information about a template unit selected by the user. | Break the "Profit" metric into its constituent parts. Expand the elements in the consolidation "Ratios" into their underlying consolidation elements. Expand the elements in the "Interesting" custom group into their underlying groupings. |
| DssDrillToMetric | The new report instance will contain a specified metric. | Add the "Profit" metric to the metrics unit. |
| DssDrillFixTemplate | The new report instance will have the same template as the original report instance. | The template in unchanged. |

1. Drill to Template

A drill-to-template action means that the original template is completely replaced with a specified template. Drill-to-template will generally be used along with a DrillElements selection that gets transferred into the filter. A user would use it to get a completely different set of information about something in the original report.

In order to specify a drill-to-template action it is only necessary to select a template to drill. In this particular case it is not really necessary to set the DrillType property. The drill action knows that it is a drill-to-template action when the NewObject property is set to be a template.

Select drill to template
DI.Action.DrillType=DssDrillToTemplate

Specify the template T2
Set DI.Action.NewObject=T2
DrillTemplateUnit Property

The user's selection of a template unit has no effect.

DrillElements Collection

The user's selection of an elements collection has no effect.

Other Drill Action Properties

None

2. Drill to Unit

The drill-to-unit action means that a new template unit is added to the original template. Any type of template unit could be added to a template using such an action. However it will most commonly be used to add an attribute to the template.

In order to specify a drill-to-unit action, all we need to know which DSS Object appears in the new template unit, so that the object can be put in the NewObject property of the drill action. In fact it is not necessary to set the DrillType property, since the drill action can deduce that it is a drill-to-unit from the type of the object assigned to the NewObject property.

Select drill to unit
DI.Action.DrillType=DssDrillToUnit

Specify that we want to drill to the "Description" of the "City" attribute
Set DI.Action.NewObject=AttributeCity
DI.Action.Forms.Add FormDescription Two other drill-to-unit actions include drill-to-child and drill-to-parent. They correspond to 'drill down' and 'drill up' respectively. These actions are distinguished by different DrillType values (DssDrillToChild and DssDrillToParent) but otherwise behave in exactly the same way as drill-to-unit. Their purpose is to cue a user in to the 'direction' of the drill.

DrillTemplateUnit Property

The user's selection of a template unit determines where in the template to put the new unit. By default the new unit replaces the template unit in the DrillTemplateUnit property. If the user has not selected a DrillTemplateUnit, then the new unit is placed as the last unit on the row axis.

DrillElements Collection

The user's selection of a DrillElements collection has no effect.

Other Drill Action Properties

Forms

If this collection is empty, then the new template unit will have whatever display forms are the default for the object in NewObject. However most template units have a Forms collection, which can be used to overwrite the default selection of forms when displaying attributes. If this collection is non-empty, then its contents will be transferred into the new template unit.

This collection defaults to empty.

KeepOriginal

False=Replace the user's selection of a template unit. (This is the default value.)

True=Keep the user's selection of a template unit. The new template will be added immediately after it on the same axis.

SortChange

This is an enumeration property that records how to treat Sorts defined on the original unit. It has the following values:

DssDrillKeepSortDefinition=Do not modify the original sort definition. Keeping the sort definition may change the order of the rows though. For example if the report used to list regions, sorted by some metric over regions, and the user drills down to cities, then the new report will sort the cities by the same metric. There is no reason why cities in the same region will still be adjacent to each other.

(This is the default value.)

DssDrillKeepSortOrder=Modify the sort in an attempt to keep rows in their original order. In the case above the sort will be modified to sort at the region level, and then to sort the cities within the region. Note that it would not be possible to do this unless KeepOriginal is set to 'True', because the sort needs to know the value at the region level.

Inline

True=Attempt to perform the drill only on selected elements, leaving the other elements alone. This drill transformation requires the report server 120 to contain a custom group over the old and new attributes with members from each. It is unlikely to be implemented until a later release. This option only makes sense if KeepOriginal is 'True'.

False=Do not inline the drill.

(This is the default value.)

Limitations

Drill-to-unit can be used to introduce attribute, dimension, consolidation or custom group units. Use the drill-to-metric action to introduce a metrics unit.

If the original template already contains the selected unit, or another template unit that is equivalent to it, then drill-to-unit will remove the old unit before inserting this unit. Two units can be different, but equivalent, if they could generate elements from the same attribute.

3. Drill to Form

The drill-to-form action includes adding an additional form to a unit on the original template. For example a user might want to drill on a "User" attribute to see additional forms for each user. For example the drill action could add the "Christian name", "Surname" and "Age" forms to users, that used to be displayed with only the "Full name" form.

In order to specify a drill-to-form action, it is only necessary to specify the form, or forms to drill. These forms are placed in the drill action's Forms collection. The DrillType enumeration should be set to DssDrillToForm.

Select drill to form
DI.Action.DrillType=DssDrillToForm

Specify that we want to drill to the "Surname" and "Age" forms
DI.Action.Forms.Clear
DI.Action.Forms.Add FormSurname
DI.Action.Forms.Add FormAge DrillTemplateUnit Property The user's selection of a template unit determines to which unit in the template the forms are added. If the user does not select a template unit, then this drill action will have no effect on the template. Similarly if the selected unit already contains the forms, then the drill action will not modify the template.

DrillElements Collection

The user's selection of a DrillElements collection has no effect.

Other Drill Action Properties

None

Limitations

Currently only the attribute, dimension and custom group template units have a Forms collection. Thus this action can only be applied to template units of this type.

If the chosen template unit used to use its default forms, then the report server 120 will replace it with a template unit that uses the list of default forms, and also the forms listed in the drill action. In the case of a dimension, the report server 120 will have to assume it knows which attribute will replace the dimension.

4. Drill to Details

A drill-to-details action asks the report server 120 to expand one of the template units to show more details about how the template unit is defined. There are three situations in which this expansion makes sense:

The template unit is the metrics unit. Each metric is defined with a formula. If the formula contains other metrics, then the metrics unit can be expanded to include the other metrics.

The template unit is a consolidation unit. Some consolidation elements are defined as a formula in terms of other consolidation elements. These elements can be expanded to show their base elements. Also it is possible to completely replace the consolidation with the attribute or attributes that it consolidates.

The template unit is a custom group. Some groups in a custom group can be expanded into smaller groups. Again it is possible to replace the custom group with the attributes over which it was defined.

To do to specify a drill-to-details action, the user sets the DrillType property to DssDrillToDetails. There are a few other properties, discussed below, that modify its effect.

Select the drill to
DI.Action.DrillType=DssDrillToDetails

DrillTemplateUnit Property

The user's selection of a template unit determines which unit in the template is expanded. If the user does not select a template unit, then this drill action will have no effect on the template.

DrillElements Collection

If the Elements collection contains elements from the user's DrillTemplateUnit, then the report server 120 will attempt to restrict the expansion to the chosen elements. In the case of metrics this is feasible, since metrics are listed individually in the metrics unit of a template. For consolidations the report server 120 can do this, if exactly one element is selected, since it will make this the Focus element of the consolidation on the template. The element selection has no effect on the template transformation for a custom group.

Other Drill Action Properties

Depth
0=Do not expand the template unit.
1=Expand the template unit by one level.
2=Expand the template unit by two levels, etc.
−1=Expand the template unit as far as possible.
This property defaults to 1.

KeepOriginal
False=If the unit is already expanded as far as possible, and if there are other units (they are always attributes) that this unit is built from, then replace this unit with the attributes.
True=Never replace this unit with other units.
This property defaults to True for a drill-to-details action.

Limitations

It is not possible, for example, to keep a consolidation unit defined over cities, and also show the complete list of cities. Such reports are forbidden, because each consolidation element is restricted to the cities from which it is calculated.

5. Drill to Metric

A drill-to-metric action transforms the report instance by adding a metric to the report instance. It is similar to drill-to-unit, but is not identical since all metrics on a template appear in the metrics unit, instead of having a unit of their own.

All this is necessary to define a drill-to-metric action is to specify the metric, which is put in the NewObject property. In fact it is not necessary to set the DrillType property, since the drill action can deduce that it is a drill-to-metric from the type of the object assigned to the NewObject property.

Select drill to metric
DI.Action.DrillType=DssDrillToMetric

Specify that we want to drill to the "Profit" metric
Set DI.Action.NewObject=MetricProfit DrillTemplateUnit Property If the template already contains a metrics unit, then the new metric is added to the existing metrics unit. In this case the user's DrillTemplateUnit has no effect. However if there is no metrics unit in the template, then it is added after the user's selected DrillTemplateUnit. If neither of these statements is true, then the metrics unit is added at the end of the row axis.

DrillElements Collection

The user's selection of a DrillElements collection has no effect.

Other Drill Action Properties

None

Limitations

If the chosen metric is already on the template, then the drill transformation has no effect on the template. If the transformation does add the metric, then it puts it at the end of the metrics unit.

6. Fix Template

A template transformation DssDrillFixTemplate specifies that the action should not modify the template. A drill action that does not modify the template could still be useful, since the drill transformation would still modify the filter. It allows a user to select part of a template, and drill, to display a smaller report that only shows the selected part of the template.

This template change has no parameters. All this is necessary is to assign the value DssDrillFixTemplate to the DrillType property.

Specify that the drill does not modify the template
DI.Action.DrillType=DssDrillFixTemplate Limitations In the fix template option, the drill action does not specify any major change to the template. However there are situations in which the template is still changed. For example if FilterMetrics is set to 'True' and the user selects some of the metrics in the template, then the template will be modified to only show the selected template.

7. Common Properties

The drill action properties described in this section apply to all values of the DrillType property.

FilterMetrics
True=Modify the template so that it only includes those metrics whose header elements appear in the Elements collection. If the collection does not contain any metric elements, then the metrics on the template are not changed.
False=Do not filter the template to only show the selected metrics.
This property defaults to True.

B. Filter Transformations

Drill action properties also effect the transformation of the filter part of the new report instance. As with the template transformation, there are a range of options that vary from making no change at all to the filter, to completely replacing it with a filter specified in the drill action.

When the report server 120 applies a drill transformation it considers up to three filters. The drill action properties describe which of these filters it uses, and in some cases how to combine them. These are the three filters.

| Name | Meaning |
| --- | --- |
| DI.DrillElements | The DrillElements collection on the drill instance represents the header elements of the grid that the user has selected. These elements are interpreted as a Filter, which will then by merged into the transformed report instance. The effect is that the transformed report is limited to the user's selection. |
| DI.BaseInstance.Filter | This is the DSS Filter in the original report instance. |
| DI.DrillAction.Filter | The drill action may also contain a filter of its own. This filter is used to "govern" the drill transformation. That is it is an extra restriction applied as part of the drill. |

1. Typical Filter Transformation Settings

The following discussion includes detail about how the transformation filter in calculated, and what properties can be used to modify it. Code snippets assist in selecting the most useful combinations of properties.

First of all the default settings intersect the user's selection with the old filter, and attempt to handle this in as smart a manner as possible. Set the Filter property if additional drill governing is required.

Reset the drill action to its default settings
DI.Action.Clear

This code specifies that we want to discard the original filter. The transformed filter will be based solely on the user's selection.

Discard the original filter
DI.Action.ReportFilter=DssReportFilterIgnore

By ignoring both filters the drill action can ask to completely replace the filter with a filter hard-coded into the drill action. In this case we want to move to filter F1.

Force the transformation to use the given filter
DI.Action.UserFilter=DssUserFilterIgnore
DI.Action.ReportFilter=DssReportFilterIgnore
Set DI.Action.Filter=F1

2. Filter from User Selection

The first source of a filter is to take it from the user's selection of DrillElements from the grid.

The algorithm for converting the user's selection into a filter is provided below, so that a designer can understand what it means to change the drill action properties (UserFilter, UseSchema and Relationship) that modify this process. However in most situations the default values for these properties will be the best values.

Each individual element corresponds to a filter. The following table describes how each type of element is converted into a filter. The type of an element can be read from its ElementType property.

| Element type(s) | Filter conversion | Example |
| --- | --- | --- |
| DssElementConcrete | A concrete element is an element from an attribute. A concrete element can be converted directly into a filter. | The element "New Haven" of the "City" attribute would become "City = New Haven" |
| DssElementConsolidation | A consolidation element is ultimately an expression over a set of joint attributes. The corresponding filter is the disjunction of each set of joint attributes. | A consolidation element defined as "[1996, DC]+[1997, NY]" would become "(Year = 1996 and City = DC) or (Year = 1997 and City = NY)" |
| DssElementCustomGroup DssElementResidue DssElementBand DssElementFilter DssElementJoint DssElementSubexpression | All of these element types are produced from custom groups. In each case the element was defined using a filter-type expression in the custom group. This expression is used for the element. | For example a custom group element derived from a filter (DssElement-Filter) is converted to that filter. |
| DssElementMetric DssElementSubtotal DssElementDimension | These elements cannot be meaningfully converted into a filter. If the user selects them, they are ignored. | Not applicable |
| DssElementFirst DssElementLast | These element types never appear in a result grid, so the user cannot select them. | Not applicable |

If the DrillElements collection is empty, or if it only contains elements that do not have an associated filter, then the user's filter is the empty filter. The empty filter is the filter defined by the empty expression. It does not apply any restriction to the data.

If the DrillElements collection only contains one element or at least only one element with a corresponding filter, then that filter is the user's filter. Otherwise several element filters combine in order to obtain the user's filter.

One approach is to AND together any selected elements that are both headers of the same cell. This produces a set of conjunctions of individual filters. We then OR all of these conjunctions together to obtain the user's filter. When the user has selected elements that lie together in a tree, we can simplify the expression, because the AND and OR operators are distributive over each other. The following diagram makes this process clear.

| Header elements (The shaded elements are selected) | Combined filter |
|---|---|
| $F_1$ | ($F_4$ and $F_8$) or $F_{10}$ or $F_{11}$ or ($F_3$ and $F_7$ and ($F_{14}$ or $F_{15}$)) |
| $F_2$     $F_3$ | |
| $F_4$    $F_5$    $F_6$    $F_7$ | |
| $F_8$  $F_9$  $F_{10}$  $F_{11}$  $F_{12}$  $F_{13}$  $F_{14}$  $F_{15}$ | |

This process describes how to make the user's filter. In many cases it is possible to simplify the filter that would be obtained by dogmatically following this algorithm. For example instead of writing "City=DC or City=New York" the filter would say "City IN (DC, New York)".

The drill action property UserFilter specifies how the report server 120 uses the user's filter. There are three options. Basically they come down to either discarding the filter, using it as it is, or attempting to handle it in a smart manner.

DssUserFilterIgnore. The user filter is not considered when constructing the transformed filter. Obviously if this setting is chosen the report server 120 will not construct the user filter.

DssUserFilterApply. The user filter, possibly intersected with other filters, will appear in the transformed filter.

DssUserFilterRelation. (This is the default setting of UserFilter.) The report server 120 may apply a relationship operator to the user filter before including it in the transformed filter. An expression containing this operator, possibly intersected with other filters, will appear in the transformed filter.

DssUserFilterEvaluate. This option is similar to DssUserFilterRelation. The report server 120 will apply (if necessary) a relationship operator to the user filter. It will then execute a report based on the modified filter to obtain a list of elements. It will place the list of elements it obtains, possibly intersected with other filters, in the transformed filter.

The third case (DssUserFilterRelation) requires more explanation. In most cases it behaves exactly the same as DssUserFilterApply. However it has a special behavior when the template transformation adds an attribute unit to the template.

Suppose that a user selects the city elements "DC", "New Haven" and "New York". This will generate a filter whose expression is something like "City IN (DC, New Haven, New York)".

Now suppose that drill action specifies that the "Region" attribute should be added to the report and that the user has chosen to drill on the "City" attribute. In other words the user is drilling up from the "City" attribute to the "Region" attribute. Then we really want the user's filter to refer to regions, in this case the region "North East USA", instead of the cities. Indeed if the user's filter is not changed then the wrong result will be obtained, since the user will confuse a metric value calculated for the three cities with the value for the entire region.

The report server 120 is not able to determine which region corresponds to the cities, since this cannot be determined without examining a look-up table in the warehouse. Instead it constructs a relationship filter which, paraphrased, states "restrict the data to the region(s) that corresponds to this embedded filter". It uses the user filter that we described above as the sub-filter.

By default the relationship is established using the relationships between attributes in the schema. However it is also possible to override this by directly specifying a relationship.

The drill action object has two properties, Relationship and UseSchema that can be used to specify alternative relationship. The application sets UseSchema to 'False' to indicate that it does not want to use the schema relationship. After doing that it can set the properties on the Relationship object to specify the relationship. (When UseSchema is 'True' the Relationship property always returns 'Nothing').

specify a non-standard relationship for this drill action
DI.Action.UseSchema=False
Set DI.Action.Relationship.Guide=FactUnitsSold The fourth case (DssUserFilterEvaluate) is very similar to the third case. It instructs the report server 120 to do the relationship work at drill transformation time, rather than leave it for when the report is executed. This may significantly slow drill transformation (since it now requires a report execution) but it may result in a filter that can be evaluated much faster, and which in some cases may be smaller.

3. Filter from Original Report Instance

The second source of a filter is from the original report instance. This will always have a filter, although of course the filter could be empty. As with the user filter, there is a property (ReportFilter) with three settings that indicate what to do with it. Again the settings come down to discarding the filter, using it as it is, or attempting to use it in a smart manner.

DssReportFilterIgnore. The report filter is not considered when constructing the transformed filter.

DssReportFilterApply. The report filter, possibly intersected with other filters, will appear in the transformed filter.

DssReportFilterSmart. (This is the default setting of ReportFilter.) The report server 120 will attempt to remove anything from the original filter which 'overlaps' with the user filter.

Again the third property needs more explanation. The original report filter may contain a complex expression that (for example) resolves into a list of cities. The user selects a couple of cities, and then drills down to something else. It is very inefficient to include the complex expression in the transformed filter, since listing the user's selection of cities would lead to the same result and could be much simpler.

However since the relationship between different filter expressions can be very subtle, there will be situations in which the report server 120 will not notice that part of the original filter could have been removed. Engine-light support is desirable to help make this simplification.

Another issue is what to do about metric qualifications that occur in the original filter. The problem is that it is ambiguous about what a metric qualification means in the transformed filter. The enumeration property QualificationChange is used to specify what to do. Of course if the report filter is ignored, then this property is irrelevant.

Suppose that the original report contains a metric qualification at the region level, and the user drills from region to city. For example the qualification asks for regions whose profit is at least 100. Then the following table lists what is done to the qualification.

| Constant name | Meaning |
| --- | --- |
| DssDrillQualOld | The qualification is remains at its original level. Thus the user is shown cities in regions whose profit is at least 100. |
| DssDrillQualNew | The qualification is moved to the new level. Thus the user is shown cities whose profit is at least 100. |
| DssDrillQualBoth | The qualification is applied at both levels. The user is shown cities whose profit is at least 100, in regions whose profits are also at least 100. |

In this example the DssDrillQualNew and the DssDrillQualBoth options would lead to the same result. However if the qualification at been a BETWEEN qualification, then all three cases lead to different results.

4. Drill Governing Filter

The third source of a filter is on the drill action itself. The drill action object has a Filter property. If this property is assigned to a filter, then the filter will be intersected with the other filters in order to make the transformation filter. There are no flags, since if the designer of a drill action does not want to use the filter, then she would simply set the drill action's filter to 'Nothing'.

Specify an additional filtering restriction on the drill action
Set       DI.Action.Filter=
   FilterQualificationSalesGreaterHundred We expect this third filter to be used for drill governing. It could either be included in a drill path of some drill action or it might be added to the drill action immediately before it is applied. The former case corresponds to a situation in which the designer of a custom drill path has specified a governing filter to be specifically applied if the user takes the path. The latter case corresponds to a user who decides to apply an additional governing filter as part of her selection of the drill she wants to perform.

IV. Specifying Drill Paths

Drill Transformations were described above as drill action objects. A drill action is used to specify what changes are made to a report instance when a drill transformation is applied to it. It is possible for an application to perform a drill on a report instance by constructing a new report instance (the drill instance), populating it with the user's selection of a template unit and elements, and specifying the drill action properties. However this approach means that the application must know which drill actions are appropriate for the original report instance.

In many cases the designer of a report definition would like to include a list of the potential drill actions for the report as part of its definition. The designer does this by associating a drill map with (the objects in) the report. The drill map contains a list of drill paths. Each drill path contains a drill action to apply if the user wants to follow the path, description information to help the user decide which is the correct path and criteria to help the report server 120 decide whether or not the path is applicable to a particular drill instance. These concepts are described below in a bottom up order, beginning with drill paths, then how a drill map can be defined from drill paths, and finally how a drill map is obtained from a report instance.

A. Importance Enumeration Constant

Every drill path contains an enumeration constant called Importance. This constant is used to mark out which paths the designer considers to be important. The report server 120 uses the importance constant when it is searching a path map to determine which paths to offer to the user as possible drill actions.

As described above with regard to the method SearchForPaths, an application calls on a report instance to ask the report server 120 to suggest drill paths and takes a parameter. This parameter specifies whether the application wants to see one path, some paths or many paths. The designer of a drill path uses its Importance parameter to tell the report server 120 how to treat a path.

The following enumeration lists the possibilities.

| Constant name | Meaning |
| --- | --- |
| DssDrillImportanceHigh | The report server 120 will include this path for all type of path searches. |
| DssDrillImportanceMedium | The report server 120 will include this path when searching for a few paths, or many paths, but not when it is searching for a single path. |
| DssDrillImportanceLow (This is the default setting.) | The report server 120 will only include this path when searching for many paths. |

Note that when the report server 120 is searching for exactly one path, then it will return the first high importance path that it finds. Accordingly, there is no point in storing more than one high importance path in a drill map.

So for example, if the designer of a drill path only wants the path to be listed as one of several paths, but does not want the path to be used for a "double-click" action then the designer needs to change the Importance property. The following code suffices.

Specify that the drill path is only used when searching for more than one path
DrillPath.Importance=DssDrillImportanceMedium In addition to the Importance property there are two other effects at work that modify the paths offered to a user:

The way that the report server 120 searches 120 for drill maps uses the user's choice of a template unit to modify which drill map it searches. Thus there is no need for a way to modify the paths depending on the user's selection of a template unit.

The report server 120 will always apply a "makes sense" criteria. This means that if the report server 120 is able to determine that for any reason a certain drill path cannot be followed, then it will exclude the drill path. For example if the drill path's action is "drill to attribute City" and City is already on the template, then the path cannot be followed. The report server 120 will automatically exclude the path from consideration, rather than bother the user with invalid paths. Other reasons to exclude a path include security settings or that the path takes the user outside the data contained within a base report. There may be situations in which a path cannot be followed, but the report server 120 will not always be able to make this determination.

B. Path Presentation

The point of a user selecting between drill paths is that the user is selecting a drill action. However the user is unlikely to understand, or want to understand, the various properties used to define a drill action. Instead a drill path has several textual properties whose values are intended to help a user select between different drill paths.

There are three presentation properties, which are the strings listed below along with the meaning intended for each property.

| String name | Meaning | Examples |
|---|---|---|
| Name | A short name that encapsulates the drill path. This string should be suitable to be used in a menu or list box to represent the path. For example a drill-to-unit action might use the name of the object that defines the unit. | "City" "Stock details" |
| Description | A detailed description of the drill path. This string should be suitable to be used in a status bar, a tool tip, or some other text box to give an uncertain user more information about the path. | "Drill to the City attribute" "Show detailed information about the history of the selected stocks" |
| SetName | This string is used to group the paths into sets. Its value is the name of the set. Two paths that have the same SetName are considered to be in the same set. Some paths may not have a set name. | "Geography" "" |

These properties are not used within the application program interface (API) to distinguish between different paths. Their sole purpose is to help the user distinguish between paths. Thus it is not an error if one or more of these properties are the empty string, or if two paths happen to have the same values for these properties. However this is not advisable since the user would be unable to distinguish between the paths.

In addition to the string properties, we draw an application author's attention to the DrillType property of the Action on a drill path. This property, whose values are enumerated above, distinguishes between drill actions by whether they are drill-to-template, drill-to-metric, drill-to-child (i.e., drill down) etc. A user may want to view the drill paths grouped by this course enumeration.

It is up to an application to determine what use, if any, to make of these properties. Preferably, the user should be first invited to select between different types of drill action. Having chosen a drill type, the user can select a set. Finally the user selects a drill path by name within the set. The user should have the option of examining the description of the path.

In order to facilitate this representation, paths in a drill instance's DrillPaths collection are listed in the suggested order. That is they are ordered lexicographically by Action.DrillType, then SetName, and finally by Name. Thus the following table shows a possible set of drill paths found by the report server 120 from some drill map.

| Drill Type | Set Name | Name |
|---|---|---|
| Drill up | | Country |
| Drill up | | Region |
| Drill down | | Store |
| Drill to unit | Product | Class |
| Drill to unit | Product | Item |
| Drill to unit | Time | Year |
| Drill to unit | Time | Month |
| Drill to unit | Time | Day |
| Drill to template | Details | Stocks |
| Drill to template | Details | City performance |

-continued

| Drill Type | Set Name | Name |
|---|---|---|
| Drill to template | Overview | Whole region |
| Drill to template | Overview | Region contribution |

C. Drill Maps

A drill map is an object (drill map object 190) that holds an ordered list of drill paths. When the application wants to obtain a list of drill paths to offer to the user, it gets the list by asking the report server 120 to search through a drill map object 190. The report server 120 walks through the paths in the map, and picks out those paths that whose criteria satisfy the user's selection as recorded in a drill instance.

There are two ways to specify drill paths. The simplest way is to explicitly specify all the properties of the drill path. This creates a custom drill path. However we also permit a drill map to contain constructs that the report server 120 interprets as multiple drill paths. These are virtual drill paths.

1. Custom Drill Paths

The simplest type of drill path in a drill map to understand is a custom drill path. A custom drill path is defined by assigning values to the path criteria and presentation properties. Assign the properties of the path's Action property to specify the transformation caused by following the path.

Suppose that DrillMap is a drill map object. This object uses an IDSSDrillMap interface. It is a collection interface that holds an ordered collection of drill path objects. The Add method creates a new drill path in the usual manner, and adds it to the collection. When a user adds a drill path to a drill map it is a custom drill path by default.

The following code creates a new a new custom path. We give it a name as we create it.

Make a new drill path called "Stock details" at the start of the collection
Dim DrillPath As IDSSDrillPath
Set DrillPath=DrillMap.Add "Stock details".1

Having made the path we need to populate its definition. The most important part of the path is its Action property. This returns a drill action object used to specify the action associated with this path.

For a simple drill to template, suppose that TemplateStockDetails is a template that shows another report that lists stock details. The default filter transformation is satisfactory. Accordingly, a drill action is as follows.

Specify the drill action to drill to a particular template
DrillPath.Action.DrillType=DssDrillToTemplate
Set DrillPath.Action.NewObject=TemplateStockDetails In order for the user to determine the meaning of the path, the presentation properties (Name, Description and SetName) of the custom drill path must be set.

Specify a description and set name. (We named the drill path as we created it)
DrillPath.Description="Show detailed information about the history of the selected stocks"
DrillPath.SetName=" "

The Importance property is optional. If the user does not set it, then it will default to low importance. This property controls whether or not the path is included when the GUI is unable to display the complete list of drill paths.

Add Importance to the custom path
DrillPath.Importance=DssDrillImportanceLow

3. Virtual Drill Paths

The problem with custom drill paths is that they require the designer of the drill map to create a path for every possible drill action that a user can take. In many cases the designer could want a large number of very similar drill paths. It is a waste of resources to create all of these paths.

Virtual drill paths alleviate this problem. A virtual drill path is added into the drill map's collection like a custom drill path. However when the report server 120 sees a virtual drill path it interprets it as several drill paths—each with a different action and presentation properties, and (usually) with different criteria. Virtual drill paths are never written into the Paths collection of a drill instance. When the report server 120 receives a match on paths in a virtual drill path, it constructs the appropriate custom drill paths to write in the drill instance.

The canonical use for a virtual drill path is to specify that the drill map contains all of the drill paths defined in some (user or system) dimension. To describe a dimension with ten attributes as a drill map would take ninety custom drill paths (since there would be a path from every attribute to every other attribute). However a single virtual drill path can encapsulate all of the paths in one object by simply listing the dimension object. The report server 120 will determine to which custom paths the virtual path maps.

There are several types of virtual paths. They are distinguished from each other (and from a custom path) by the PathType property. The following table lists the types of virtual paths.

| PathType | Meaning | Example |
| --- | --- | --- |
| DssDrillPathCustom | This is a custom path. | Include the "Stock details" custom drill path. |
| DssDrillPathDimension | The virtual drill path is specified using a dimension. It contains drill-to-unit custom paths for each pair of attributes in the dimension. | Include all the drill paths defined by the system dimension. |
| DssDrillPathDetail | The virtual drill path is specified using the standard template unit criteria. It contains custom paths that give more information about the selected units. These include drill-to-details and drill-to-forms actions. | Include all the drill-to-form paths for forms in the "City" attribute. - OR - Include all drill-to-form paths for all forms in all attributes on the report instance's template. |
| DssDrillPathUseMap | The virtual drill path consists of a reference to another drill map object. We want to include all of the drill paths in the other drill map. | Include the "Project default map" drill map object. |

The report server 120 and specifically drill map management tools 140 treat each virtual drill path as if it were a collection of custom drill paths. In the following sections we will discuss each type of virtual path in turn, and specify what properties the report server 120 assigns to the custom paths it makes from them.

A virtual path has the same drill path properties as a custom path. As we have listed below the report server 120 assigns some of these properties when it makes the custom paths. Those properties that we don't mention below are given whatever value was in the virtual path.

For example the report server 120 does not assign a value to the KeepOriginal property of a drill action made from a dimension virtual path. So the designer of the drill map can specify whether or not a dimension path always keeps the original template unit on drilling, or never does. However if the designer wants to keep the original unit for some dills inside the dimension, but not for others, then the designer cannot use virtual drill paths. Instead, the designer must put in a custom drill path which explicitly specifies every desired action.

a. Dimension Virtual Path

The dimension virtual path specifies that we want to include all of the paths defined between attributes in a dimension. The dimension can be the system dimension (that contains the schema relationships between attributes) or it may be a user dimension (that contains an arbitrary hierarchy on attributes).

There are only two things that need to be done to insert a dimension virtual path into a drill map. First the path needs to be added. We specify the path type instead of a name. Then we need to set the dimension of the new path, by assigning it to the PathObject property. If desired, other properties of the virtual path may also be set to non-default values.

Insert a dimension virtual path at the end of the map's collection
Set DrillPath=DrillMap.Add DssDrillPathDimension Specify the dimension to be the (user defined) Geography dimension
Set Drill Path.PathObject=DimensionGeography The report server 120 treats a dimension virtual path as if it contains a custom drill path for every order pair of distinct attributes in the dimension. The path is a drill-to-unit path from the first attribute in the pair, to the second attribute. It also contains custom drill paths from every attribute that appears on the template to every (different) attribute in the dimension.

Observe that since a user dimension does not have to be symmetric, it is possible that A is a parent of B, while B is not a parent of A. This will not happen for the system dimension.

The following table lists the properties of the custom drill paths that are assigned by the report server 120, and how it determines them. All of the other properties of the custom drill path are given the same value as on the virtual drill path.

| Property | Value | Source |
| --- | --- | --- |
| Action.NewObject | A DSS Attribute object. This is the attribute that will be added to the template. | Every attribute in the dimension. |
| Action.DrillType | The direction of the drill action. It is one of the following values: - DssDrillToParent DssDrillToChild DssDrillToUnit. | Unless there is a (possibly indirect) parent-child relationship between Action.NewObject and UnitDetail then this |

-continued

| Property | Value | Source |
|---|---|---|
| | | property is set to drill-to-unit. |
| Action.Forms | The collection of display forms for the new attribute. | This is read from Forms collection of the new attribute on the Dimension object. |
| Importance | Indicates if the path can be found by a search for a single path. It is one of the following values: - DssDrillImportanceHigh DssDrillImportanceLow | If the new attribute is the default child of the original attribute then we use the high setting. Otherwise we use the low setting. |
| Name | The name of the new attribute. | Read from the attribute. |
| Description | The description of the new attribute. | Read from the attribute. |

Detail Virtual path.

All that needs to be done to create a detail virtual path is to specify its type. The detail is applied to all applicable objects. That is, if this virtual path appears on a map on an object, then it only applies to the object. If it appears on the main map of a template, or on the map of the project object, then it applies to all objects in the template.

Thus the following code inserts a virtual drill path based on the 'City' attribute. This virtual path will be treated as drill-to-form paths for each of the (not already displayed) forms of the 'City' attribute.

Add the virtual path to the map
Set DrillPath=DrillMap.Add DssDrillPathDetail

Attach the map to the City, so it on only applies to cities
Set AttributeCity.DrillMap=DrillMap For a detail virtual path the report server 120 constructs custom paths separately for each appropriate template unit. The following table describes how it does this for attribute unit. We create one drill-to-form path for each form that the attribute supports.

| Property | Value | Source |
|---|---|---|
| Action.DrillType | Always set to DssDrillToForms. | Drilling to forms is the only way to increase the detail on an attribute. |
| Action.Forms | Always contains a single DSS Attribute Form object. | Read from the collection of forms supported by the attribute. |
| Name | The name of the new form. | Read from the form. |
| Description | The description of the new form. | Read from the form. |

A consolidation only has a drill-to-detail action, since consolidation elements do not have forms. There is no point in using a virtual path, unless it applies to all consolidations.

| Property | Value | Source |
|---|---|---|
| Action.DrillType | Always set to DssDrillToDetails. | Drilling to details is the only way to increase the detail on a consolidation. |
| Name | The name of the consolidation | Read from the consolidation. |
| Description | The description of the consolidation. | Read from the consolidation. |

Custom groups are treated in the same manner as consolidations.

| Property | Value | Source |
|---|---|---|
| Action.DrillType | Always set to DssDrillToDetails. | Drilling to details is the only way to increase the detail on a custom group. |
| Name | The name of the custom group | Read from the custom group. |
| Description | The description of the custom group. | Read from the custom group. | c. Map Virtual Path

The map virtual path specifies that we want to include all the drill paths defined from some other drill map object. This feature allows a designer to construct one drill map that contains the 'standard' drill paths, and than use a specialized map to add a few additional paths, and then revert to the original map.

To specify a map virtual path, the user must first create a drill path in the usual manner, and specify that it is a map path. Then use the PathObject property to specify the drill map for inclusion.

Insert a map virtual path at the end of the map's collection
Set DrillPath=DrillMap.Add DssDrillPathDetail Specify that the MapDefault should be searched
Set DrillPath.PathObject=MapDefault When the drill map management tools 140 of the report server 120 encounter a map virtual path, they will examine the virtual path's criteria. If the criteria match the current drill instance settings, the drill map management tools 140 will search the map next. After completing the map search, the drill map management tools 140 will return to the original map object, and start searching at the next place after the map virtual path. If the drill map management tools 140 skip over a map, without searching it, if the criteria don't match.

For example the following code modifies the drill path so that the MapDefault object is only searched if the user has selected an attribute.

Specify that the user'template unit selection must be an attribute
DrillPath.UnitCriterion=DssDrillUnitType
DrillPath.UnitDetail=DssTemplateAttribute Once the drill map management tools 140 have decided to search another map object, they treat the paths in the object in exactly the same manner as the paths in the original map object. All of the properties of the custom drill paths that the drill map management tools 140 obtain eventually obtains come from the dependent map object. In particular the contents of the virtual path's Action, Name etc. properties are not used.

3. Drill Map Selection

A drill map is an object that is saved into metadata as a separate object. This allows a designer to share drill maps between reports. A Drill Map object is made in the usual manner by calling the NewObject method on the DSS Object Server, and asking for a DssTypeDrillMap object.

Dim DrillMap As IDSSDrillMap
Set DrillMap=ObjectServer.NewObject DssTypeDrillMap Clearly, the first path of using a drill map is that it needs to be created, populated, and saved. However, since a project may contain many drill maps, the report server 120 needs to know which drill map to use when it executes a particular report. The application may pass a drill map directly to the report server 120 as a parameter when it asks to perform the search. However this approach is only intended for situations in which the application has some non-standard method to determine what drill map to use for a particular drill instance.

The drill map management tolls 140 of the report server 120 find a drill map by looking in several places. Each place may or may not contain a map. As soon as the report server 120 examines a place that does contain a map, it will select that map. Once it has found a map it does not go on to examine the other places in the sequence.

The report server 120 searches in a different place if there is a template unit, than if there isn't one. If there is a template unit, the drill map management tools 140 look in the following places: the DrillMap property of the template unit on the original report instance that the user selected. If the unit is based on a single object (attribute, dimension, consolidation or custom group) then the drill map management tools 140 will look at the DrillMap property of that object. This isn't possible if the user drills on the metrics template unit. Finally the drill map management tools 140 look at the UnitDrillMap property of the project object.

Alternatively if the user has not selected a template unit then the drill map management tools 140 look in the following places: The DrillMap property of the template. The DrillMap property of the project object.

For example if a designer wishes to specify a drill map for a template, the designer would execute the following code. The report server 120 would use this map provided that the user has not selected a template unit.

Specify the drill map of a template
Set Template DrillMap=MyFavouriteDrillMap

4. Default Drill Paths

Different measures must be taken if the drill map management tools 140 cannot find a drill map, or if the drill map on the project object. If an application dislikes this behavior it should provide its own drill maps at either the level of the object being drilled upon, or at the template level.

a. No Drill Map at All

The absence of a drill map should be an infrequent occurrence. The behavior of the report server 120 depends on the type of template unit that the user is drilling into.

Attribute. The report server 120 will pretend that it found a drill map whose sole contents was a dimension virtual path based on the system dimension. This will permit old style drilling to other attributes, but nothing else. The attributes will not be grouped by dimension, since the system dimension contains all of the attributes. It is likely that the user will not get a good drilling experience.

Custom group or consolidation. The report server 120 will pretend that it found a drill map that contains drill paths to the underlying attributes of the custom group or consolidation object. It will identify these as drill-to-child maps.

Metric. The report server 120 will generate a DrillToDetails path for any metric added to the collection of drill elements.

None. The report server will also pretend that it found a drill map with one dimension virtual path based on the system dimension. In other words it will offer a drill-to-unit for each attribute.

As usual a drill path will not be shown if it would lead to an invalid report because of repeated use of the same attribute. When drilling from an attribute a drill-to-unit will be shown as a drill-to-child or drill-to-parent as appropriate.

b. Project Level Drill Path

More typically, the report server 120 will find a drill map on the DSS Project object. This drill map will contain a list of dimensions as virtual drill paths. These are the dimensions that the administrator wants to use when defining drill paths. Any type of dimension can be used as a virtual drill path.

Again the behavior depends on the template unit from which the user wants to drill.

Attribute. The report server 120 will list drill paths to all attributes that appear in the listed dimensions. Where appropriate it will use drill-to-child or drill-to-parent, but most of them will appear as drill-to-unit.

Custom group or consolidation. The report server 120 will draw drill paths from two sources. From the drill map it will obtain a list of attributes. These will be shown as drill-to-unit paths. From the custom group or consolidation it will also obtain a list of attributes, which it will show as drill-to-child paths. The latter will be at the higher priority.

Metric. The report server 120 will generate a DrillToDetails path for any metric added to the collection of drill elements. In other words the drill map is not used.

None. The report server 120 will offer a drill-to-unit for every attribute in a dimension in the drill map.

As usual a drill path will not be shown if it would lead to an invalid report because of repeated use of the same attribute.

The above-mentioned operations can be performed on both base reports and subset reports. A subset report is a report that is defined as containing a subset of the data of some other report, known as its base report. A subset report is evaluated by first evaluating its base report on the RDBMS in the usual manner. Then the Analytical Engine extracts the subset report from the base report, without using the RDBMS at all. The advantage of this approach is that if many subsets are defined off the base report, considerable RDBMS work can be avoided.

The report server 120 understands the subset report mechanism, and by default will attempt to make use of it. This is controlled by the drill instance property UseSubsetReports, which defaults to 'True'. If an application wants to turn off the special behavior described later in this section it must modify this property before calling the report server 120.

Disable report subsenting support in the report server
DrillInstance.UseSubsetReports=False The report server 120's support for subset reports takes two forms. Note that this support only applies to subset reports. Drilling on a base report will always obtain another base report, regardless of the setting of UseSubsetReports.
1) When searching for drill paths on a subset report, the report server 120 will not suggest drill paths that cannot be followed using the data in the base report.
2) When applying a drill action to a subset report, the report server 120 will construct the new report instance as a subset report of the same base report that the original report used.

The objective of (2) is speed. Since the base report was recently executed (to make the original report), it is highly likely that the Report Server 120 will find it in its cache. So the drilled report can be generated immediately by analytical engine 104 from cached data. The objective of (1) is not to confuse the user by offering a drill path that cannot be followed properly.

For example, suppose that a base report contains 'Country', 'Region' and 'City' attributes, and that the 'Store' attribute is a child of 'City' in the schema. A subset report of the base report contains 'Country' and 'Region', but misses out 'City'. The drill contains a virtual path for the entire dimension. The following table shows what happens.

|  | Default | With UseSubsetReports set to 'False' |
|---|---|---|
| Drill to 'City' | Available (City is in the base report) | Available |
| Drill to 'Store' | Not available (Store is not in the base report) | Available (The base report is irrelevant) |

The report server 120 will always construct a subset report when drilling into a subset report with UseSubsetReports set to 'True'. It is possible that the drill instance's DrillAction leads to the production of a report that cannot be evaluated using data in the base report, because either the application turned off UseSubsetReports when searching the drill map, or it modified the action itself. In these cases the drilled report will execute, but it will be returned with 'faked' data. This feature is provided so that a user can examine the format of a report drilled "outside the box" before deciding whether or not to execute the report against the RDBMS, If a user wants to drill on a report instance that was itself made by drilling into a report instance, two questions require consideration: what drill map does the new report definition use, and what support is available for remembering the drill history of the new report.

There is no difference as a report between a report instance made directly from a report definition (or a filter and template) and a report instance made by applying a drill transform to another report instance. In both cases the report instance is defined from a report definition object, which in turn contains a filter, and one (or more) templates, although when a report is made by a drill transformation the DSS Objects will not be saved in a metadata repository. Of course the second report instance (the drill instance) will have non-trivial values in its Drill . . . properties, which record the settings used to make the report definition, filter and template.

The report sever 120 does not consider the origin of a report instance when drilling into it. Its sole concern is to examine the definition of the objects that it finds in the report instance, and apply a drill action to them. So to explain what happens on a subsequent drill, all we need to do is to explain what drill map the report server 120 attaches to the new report instance.

The report server 120 does the following things when it makes a new report instance:
If the drill type is drill-to-template, then the new template will be the specified template. The report server 120 will not edit the template.
Otherwise it will attempt to carry forward the drill maps from the original template to the new template. The template's DrillMap is carried directly over. The drill maps on the template units are carried over if some template unit appears in both templates.
If a new template unit appears in the new template, then it will never have a drill map. The report server 120 will use the default map of the object in the template unit if the user drills again on the new template unit.

A report instance that was made by a drill transformation records how it was made. This allows an application to support a 'drill back' functionality in which a report instance is replaced by the report instance from which it was drilled. However when a report definition is saved into metadata from a report instance, this information is not saved with it.

The drill history of a report instance can be found by examining its Drill . . . properties (DrillTemplateUnit, DrillElements etc.) On a usual report instance they are empty. If a report instance was made by a drill transformation, then they will contain the properties used to specify the drill transformation.

The BaseInstance property returns the original report instance. Normally this property is used to contain the base instance of a subset report instance. However if a report instance was made by drilling, then either it is not a subset report, or its base report is the same base report as its original report used.

So the following function implements a single step 'drill back' functionality. It returns 'Nothing' if the report instance was not made by a drill action.

Sub DrillBack(RI As IDSSReportInstance) As IDSSReportInstance
  If RI Is Nothing Then Exit Sub
  Was this report instance made by drilling?
  If RI.DrillAction Is Nothing Then
    Set DrillBack=Nothing
  Else
    Read the original report instance from the drill instance
    Set DrillBack=RI.BaseInstance
  End If
EndSub Executing Drillback(DrillBack(RI)) would move back two steps in the drill history of RI. It would return 'Nothing' if RI was not made by two successive drills.

The system stores the entire drill instance so that an application has access to the complete history of the drill. Thus in addition to obtaining the original report, the application can also discover the drill action, and the user's selection of elements and template unit.

When a report instance is moved around, or stored, we will store the drill history with the report instance. This means that we will also store all the previous report instances used to make the report instance. However we will not store the data obtained from running the report instances, since this would make the top report instance far too large. The data will almost certainly be in the report cache since the user must have recently executed the report instances to obtain the report instance into which she drilled.

The drill history is part of the report instance, not part of the report definition. This is because drilling is performed as an analysis action, not as report construction. If a user chooses to save a drilled report instance as a new report object, the drill history will not be saved as part of the new report. The new report will behave exactly as if the user had constructed it directly.

Figure 6:
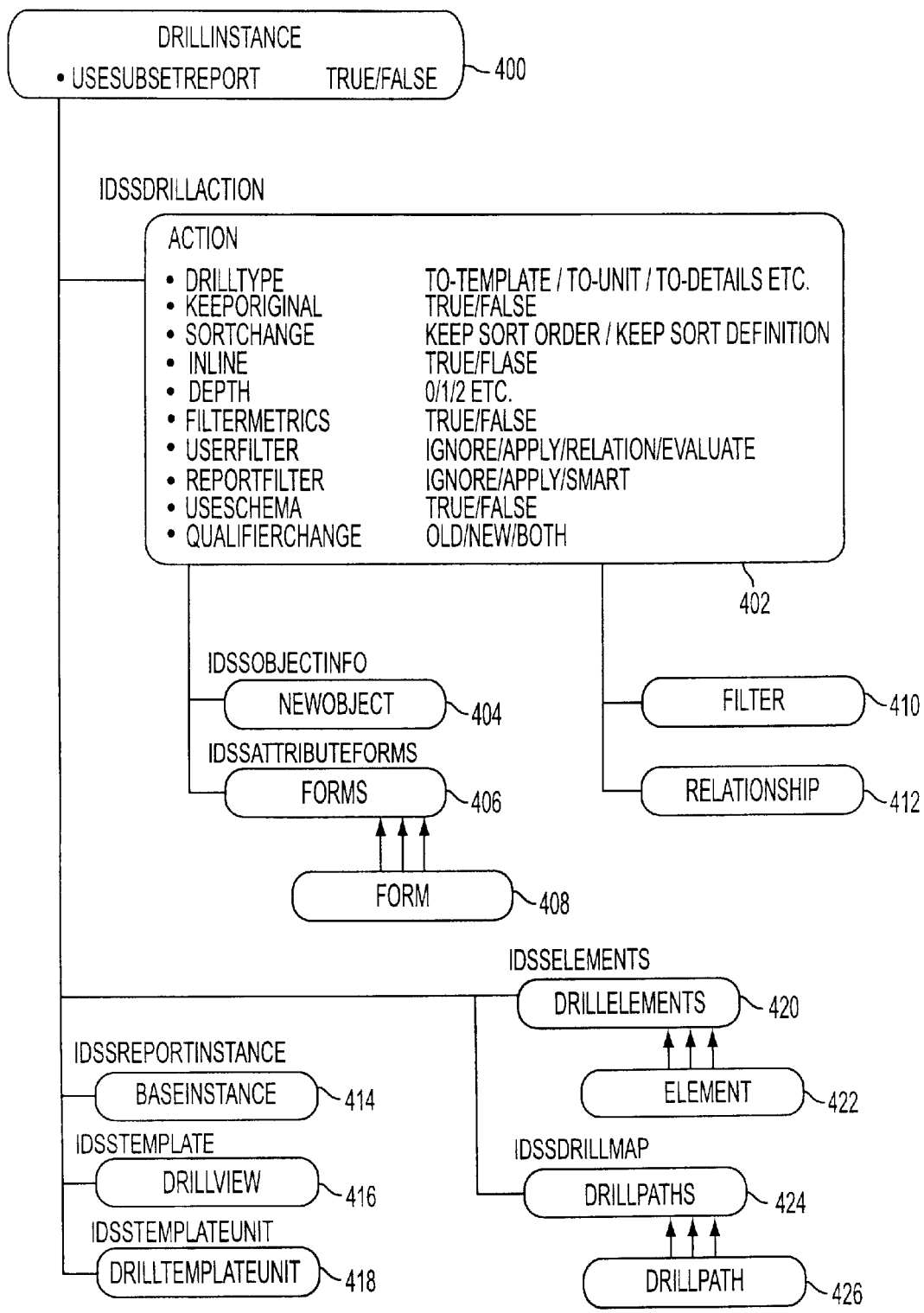
FIG. 6 is a flow chart illustrating an object map for an embodiment of the invention.

FIG. 6 is a diagram summarizing the properties on the interfaces introduced in this document. This diagram shows the IDSSReportInstance and the IDSSDrillAction interfaces. FIG. 6 only shows the report instance properties that are used for drilling. A drill instance 400 is associated with a drill action 402. The drill action 402 is shown in conjunction with a new object 404, forms 406, a selected form 408, a filter 410, and a relationship 412. Also shown are a report instance 414, a template 416, a template unit 418, drill elements 420, a selected element 422, drill paths 424, and a selected drill path 426.

Figure 7:
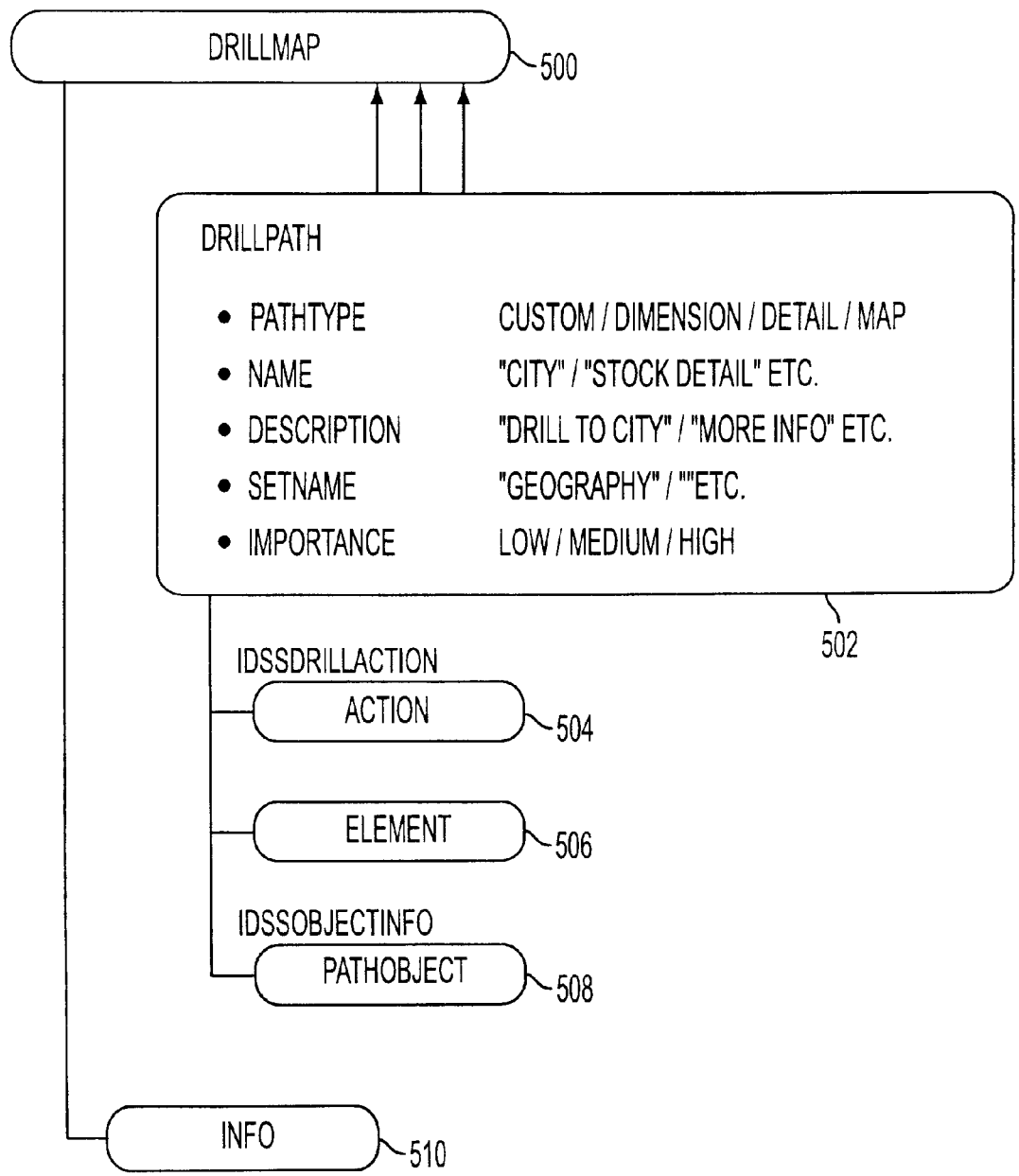
FIG. 7 is a flow chart illustrating an object map for an embodiment of the invention.

FIG. 7 shows the IDSSDrillMap and IDSSDrillPath interfaces. Observe that IDSSDrillMap is really just a collection of drill paths. However since a drill map is a DSS Object, it has, as do all DSS Objects an IDSSObjectInfo interface. FIG. 7 shows a drill map 500, a drill path 502, an action 504, an element 506, a path object 508, and info 510.

In summary, in order to support drilling, the system contains facilities to construct a new report instance, based on an existing report instance and a user's selection of elements and template units the report instance. This process is called a drill transformation. Since there are many different ways to transform a report instance into another report instance, the system provides a way for the creator of a report to associate many possible drill actions with a report at definition time. When a user wants to drill a report, the user is invited to choose between these drill paths. Since a complete specification of the drill paths on a report can be complex, the system provides default drill paths based on the definitions of objects used in the report.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A system for guiding a user's drilling into a report, the report formed through combining a template with a filter and including a plurality of dimensions, the system comprising:
    a report server for managing reports;
    drill transformation tools accessible to the report server for allowing a user to drill within a first dimension or from the first dimension to a second dimension, the drill transformation tools including means for receiving information including a report instance and a user's drilling selection and means for processing the information to produce a transformed drill instance; and
    drill map management tools accessible to the report server for managing stored information related to each report, the stored information including drill map associated with a report, the drill map containing a sequence of available drill paths for that report to facilitate drilling, the available drill paths providing actions to generate a new, valid report definition based on data available in the database and one or more criteria that specify under what circumstances that drill path may be applied; and
    wherein the report server identifies the drill map for a report instance and checks the criteria for drill paths in the drill map to reject drill paths that do not satisfy those criteria based on properties of a report instance being generated by the report server.

2. The system of claim 1, further comprising a reports cache maintained by the report server.

3. The system of claim 1, further comprising objects accessible to the report server for guiding drilling, the objects including one or more of a report instance object, a drill action object, a drill path object, and a drill map object.

4. The system of claim 3, wherein the report instance object comprises information for each report instance, the information including one or more of report definitions, report execution results, a reference to an original report instance if the report instance was created by drilling, header elements on which drilling was performed, a list of applicable drill paths, and a drill action selected by the user.

5. The system of claim 4, wherein the report instance object comprises a drill instance object if the report instance object holds a definition of a drill transformation.

6. The system of claim 3, wherein the drill action object comprises a drill transformation definition including template and filter modifications.

7. The system of claim 3, wherein the drill path object describes a path for a selected report and includes the drill action object for the selected report.

8. The system of claim 7, wherein the drill path object further includes one or more of presentation information including a name, a description, and a grouping construction.

9. The system of claim 7, wherein the drill path object further comprises a value indicating a level of importance of the path.

10. The system of claim 3, wherein the drill map object includes means for associating a collection of paths with a report instance.

11. A method for guiding a user's drilling into a report, the method comprising the steps of:
    receiving information including a report instance and a user's selection on a report instance;
    receiving a user's drilling request;
    identifying a drill map for the report instance based on the drilling request, the drill map including one or more drill paths and one or more criteria that specify under what circumstances each drill path may be applied; and
    checking the criteria for drill paths in the drill map to reject drill paths that do not satisfy those criteria based on properties of a report or drill instance being generated by the report server to thus generate a revised drill map;
    offering the user a drilling choice, the drilling choice including a report server selection option in which a report server selects at least one drill path based on the revised drill map for the report, the drilling choice further including a self-selection option in which the user specifies the drilling path;
    creating a new report definition based on the received drilling choice; and
    executing a new report based on the new report definition.

12. The method of claim 11, further comprising the steps of:
- accessing a drill map for the report instance if the user selects the report server selection option, the drill map including a sequence of drill paths;
- providing a user with a selection of drill paths, the selection including at least one possible drill path.

13. The method of claim 11, further comprising the step of constructing a drill instance to hold a drill transformation result upon receiving a user's drilling request.

14. The method of claim 13, further comprising the step of populating the drill instance.

15. The method of claim 11, further comprising the step of allowing the user to drill both within a first dimension and between the first dimension and a second dimension.

16. A method for guiding a user's drilling into a report, the method comprising the steps of:
- receiving information including a report instance and a user's selection on a report instance;
- receiving a user's drilling request;
- accessing a drill map associated with the report instance, the drill map including a sequence of drill paths and for at least one of the drill paths, one or more criteria that specify under what circumstances that drill path may be applied;
- providing a user with a selection of drill paths, the selection including at least one possible drill path through a process that includes the act of checking for drill paths in the drill map to reject drill paths that do not satisfy those criteria based on properties of a report or drill instance being generated by the report server;
- receiving a path selection from the user;
- creating a new report definition based on the received user selection; and
- executing a new report based on the new report definition.

17. The method of claim 16, further comprising the step of constructing a drill instance to hold a drill transformation result upon receiving a user's drilling request.

18. The method of claim 17, further comprising the step of populating the drill instance.

19. A method of guiding a user's drilling into a report, the method comprising the steps of:
- receiving information including a report instance and a user's selection on a report instance;
- receiving a user's drilling request;
- accessing a drill map, the drill map having been constructed by an expert capable of guiding the user through an investigation, the drill map including a sequence of drill paths and for at least one of the drill paths, one or more criteria that specify under what circumstances that drill path may be applied;
- providing the user with a selection including at least one drill path selected from the drill map through a process that includes the act of checking for drill paths in the drill map to reject drill paths that do not satisfy those criteria based on properties of a report or drill instance being generated by the report server; and
- creating and executing a new report definition based on the selection.

* * * * *